Patented Dec. 12, 1950

2,534,193

UNITED STATES PATENT OFFICE 2,534,193

COPOLYMERS OF STYRENE AND PARA-VINYLBENZYL COMPOUNDS

William S. Emerson, Dayton, Ohio, assignor to Monsanto Chemical Company, St. Louis, Mo., a corporation of Delaware No Drawing. Application April 22, 1949, Serial No. 89,143

3 Claims. (Cl. 260—87.3)

This invention relates to the production of valuable resinous products by the conjoint polymerization of styrene and p-vinylbenzyl derivatives. More particularly the invention relates to copolymers of styrene and either p-vinylbenzyl alcohol or p-vinylbenzyl acetate.

Polystyrene is a valuable and useful article of commerce but is limited for many uses by certain inherent physical properties. The primary purpose of this invention is to provide copolymers of styrene which are less brittle and have higher elongations and impact strengths than polystyrene. A further purpose of the invention is to provide a new and valuable copolymer of styrene.

In copending application Serial No. 678,673, filed June 22, 1946, by William S. Emerson, of which this application is a continuation-in-part, there are described and claimed new chemical compounds, p-vinylbenzyl alcohol and p-vinylbenzyl acetate, the latter of which is prepared by the pyrolysis of p-(α-acetoxyethyl) benzyl acetate in the presence of silica gel and steam at a temperature of 475 to 500° C. The ester so formed may be hydrolyzed with alkali in the presence of sulfur and hydroquinone as polymerization inhibitors to form the alcohol. The new chemical compounds described and claimed in the copending case may be represented by the following structural formula:

wherein R is selected from the group consisting of H—, and

The new and valuable copolymers of styrene may be prepared with from 60 to 99 percent by weight of styrene and from one to 40 percent of the new alcohol and acetate. A preferred group of copolymers, which have unusually valuable properties are those with from 70 to 95 percent by weight of styrene and from five to 30 percent of the p-vinylbenzyl alcohol or p-vinylbenzyl acetate. The new copolymers may be prepared by either mass, solution or emulsion polymerization methods, in the presence of suitable peroxide catalysts and other expedients conventional in the preparation of olefin polymers.

It is frequently desirable to use mass polymerization methods. Although no catalysts are required it is often advantageous to conduct the polymerizations in the presence of from 0.005 to 1.0 percent by weight of an oxygen producing substance, such as benzoyl peroxide, isopropyl percarbonate, hydrogen peroxide, acetyl peroxide, or other peroxide which is soluble in the monomer. The rate of polymerization will depend upon the quantity and particular nature of the catalyst used. Temperatures between 50 and 200° C. are effective and a period of time varying from two to a hundred or more hours may be used to complete the reaction and produce clear, transparent, solid resins. Frequently it is desirable to initiate the polymerization at lower temperatures and gradually, or periodically, increase the temperature as the polymerization proceeds. The solid polymer obtained by the mass polymerization is generally ground to particles of the desired size which may be used in molding operations or for the fabrication methods conventional in the art.

The new copolymers may also be prepared by polymerization in an aqueous medium. The monomer may be charged at the outset of the reaction or gradually introduced into the aqueous medium throughout the reaction. Usually an emulsifying agent is used, for example a rosin soap, a sodium alkyl sulfate, triethanolamine, salts of sulfonated hydrocarbons and water soluble salts of high molecular weight fatty acids, and mixtures thereof obtained by the saponification of animal and vegetable oils, and other compounds containing both hydrophobic and hydrophilic radicals. The emulsion polymerizations are catalyzed by means of water soluble peroxides, such as sodium peroxide, hydrogen peroxide, potassium persulfate, and potassium perborate, which may be charged at the outset of the reaction or in increments throughout the duration of the polymerization. Upon completion of the polymerization the solid polymer is separated from the aqueous phase by precipitation and filtration, the precipitate usually being induced by the destruction of the emulsifying agent. In some instances the emulsion may be directly dried without precipitation of the solid polymer. The copolymer in the finely form, as obtained from the emulsion polymerization may be used directly as a molding powder.

Further details of the preparation are set forth with respect to the following examples.

Example 1

A copolymer of p-vinylbenzyl acetate and styrene was prepared using ten percent by weight of the acetate and 90 percent styrene. The monomers were mixed and heated at 125° C. for six days. A colorless glasslike resin was thereby produced which was found to possess physical properties similar to polystyrene except that the elongation was 3.9 percent, whereas polystyrene elongation under the same condition was 2.5 percent.

The copolymer by reason of its elongation was tougher than the polystyrene, and when the tensile products are compared the copolymer shows unusual advantages.

|  | Tensile | Elongation | Tensile Product |
|---|---|---|---|
| Polystyrene | 5,100 | 2.5 | 12,750 |
| Copolymer | 4,700 | 3.9 | 18,300 |

The tensile product is more significant than the tensile strength because it applies a corrective factor for the reduced cross section area due to the elongation at the break point.

*Example 2*

A series of copolymers were prepared and a polystyrene for control purposes. The monomers were heated without catalyst for three days at 80° C., three days at 100° C., and finally four days at 125° C. Tough non-brittle solid resins which were hard and colorless were thereby formed. Tensile and flexural properties were measured as follows:

| Styrene | Vinylbenzyl Acetate | Tensile, p. s. i. | Flexural, p. s. i. |
|---|---|---|---|
| 100 | 0 | 4,700 | 11,000 |
| 90 | 10 | 4,300 | 9,000 |
| 80 | 20 | 4,000 | 5,900 |
| 70 | 30 | 3,400 | 4,900 |

The above table demonstrates that tensile and flexural strengths are reduced by progressive increases in vinylbenzyl acetate content, but if there is present in the monomeric mixture being polymerized 60 or more percent of styrene the reduction in strength is not serious. This is especially true in view of the increase in elongation achieved and the elimination of the brittleness inherent in the polystyrene.

The p-vinylbenzyl alcohol also forms similar copolymers.

The invention is defined by the following claims.

I claim:

1. A copolymer of 60 to 99 percent by weight of styrene and one to 40 percent of a compound of the structural formula:

wherein R is selected from the group consisting of H—, and

2. A copolymer of 70 to 95 percent by weight of styrene and five to 30 percent of p-vinylbenzyl alcohol.

3. A copolymer of 70 to 95 percent by weight of styrene and five to 30 percent of p-vinylbenzyl acetate.

WILLIAM S. EMERSON.

REFERENCES CITED

The following references are of record in the file of this patent:

UNITED STATES PATENTS

| Number | Name | Date |
|---|---|---|
| 2,383,922 | Soday | Aug. 28, 1945 |

OTHER REFERENCES

Marvel et al., Journal American Chemical Soc., vol. 67, December, 1945, pages 2250–2252.